(12) United States Patent
Hata et al.

(10) Patent No.: US 12,523,719 B2
(45) Date of Patent: Jan. 13, 2026

(54) MAGNETIC FIELD MEASURING APPARATUS

(71) Applicant: ADVANTEST CORPORATION, Tokyo (JP)

(72) Inventors: Yoshiyuki Hata, Miyagi (JP); Hisao Hori, Niigata (JP); Bunichi Kakinuma, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 221 days.

(21) Appl. No.: 18/553,598

(22) PCT Filed: Feb. 1, 2022

(86) PCT No.: PCT/JP2022/003770
§ 371 (c)(1),
(2) Date: Oct. 2, 2023

(87) PCT Pub. No.: WO2022/259601
PCT Pub. Date: Dec. 15, 2022

(65) Prior Publication Data
US 2024/0111003 A1 Apr. 4, 2024

(30) Foreign Application Priority Data
Jun. 10, 2021 (JP) .................. 2021-097121

(51) Int. Cl.
*G01R 33/06* (2006.01)
(52) U.S. Cl.
CPC ................... *G01R 33/063* (2013.01)
(58) Field of Classification Search
CPC ...... G01R 33/06; G01R 33/063; G01R 33/02; G01R 15/148; G01R 33/422; G01R 33/446
See application file for complete search history.

(56) References Cited

U.S. PATENT DOCUMENTS

2012/0038358 A1 2/2012 Honkura et al.
2015/0219731 A1 8/2015 Yamamoto et al.
(Continued)

FOREIGN PATENT DOCUMENTS

CN 106291406 1/2017
JP 2000-180521 6/2000
(Continued)

OTHER PUBLICATIONS

International Search Report Issued in International Patent Application No. PCT/JP2022/003770, dated Mar. 29, 2022, along with an English translation thereof.

*Primary Examiner* — Son T Le
(74) *Attorney, Agent, or Firm* — Greenblum & Bernstein, P.L.C.

(57) ABSTRACT

A magnetic field measuring apparatus for measuring a to-be-measured magnetic field includes a magnetic impedance element with an impedance change rate that changes depending on the to-be-measured magnetic field, a drive signal providing section and a measurement range setting section. The drive signal providing section provides a drive signal to the magnetic impedance element. A measurement range setting section sets a measurement range in which the to-be-measured magnetic field can be measured. A relationship between the to-be-measured magnetic field and the impedance change rate is arranged to change depending on a frequency of the drive signal. The measurement range setting section is arranged to set the measurement range by setting the frequency.

16 Claims, 7 Drawing Sheets

(56) References Cited

U.S. PATENT DOCUMENTS

| | | |
|---|---|---|
| 2017/0219661 A1 | 8/2017 | Hata et al. |
| 2018/0014738 A1 | 1/2018 | Tanaka et al. |
| 2019/0227128 A1 | 7/2019 | Hata |

FOREIGN PATENT DOCUMENTS

| | | | | |
|---|---|---|---|---|
| JP | 2000-292512 | | 10/2000 | |
| JP | 2001185778 A | * | 7/2001 | ............ B82Y 25/00 |
| JP | 2001-221837 | | 8/2001 | |
| JP | 2003-35757 | | 2/2003 | |
| JP | 2003-177167 | | 6/2003 | |
| JP | 2005-62000 | | 3/2005 | |
| JP | 2007322125 A | * | 12/2007 | |
| JP | 2008-76286 | | 4/2008 | |
| JP | 2008076286 A | * | 4/2008 | |
| JP | 2010-78343 | | 4/2010 | |
| JP | 2010-256109 | | 11/2010 | |
| JP | 2015-145800 | | 8/2015 | |
| JP | 2017-133993 | | 8/2017 | |
| JP | 2018-007821 | | 1/2018 | |
| JP | 2019-124661 | | 7/2019 | |

\* cited by examiner

10

10

MAGNETIC FIELD MEASURING APPARATUS

TECHNICAL FIELD

The present invention relates to measuring a magnetic field.

BACKGROUND ART

There have conventionally been known magnetic sensors that each utilize, for example, a magnetic impedance element (see Patent Literatures 1 to 4, for example). It has also been known to incorporate magnetic sensors into various circuits (see Patent Literatures 5 to 7, for example).

CITATION LIST

Patent Literature

Patent Literature 1: Japanese Patent Application Publication No. 2010-256109
Patent Literature 2: Japanese Patent Application Publication No. 2001-221837
Patent Literature 3: Japanese Patent Application Publication No. 2000-292512
Patent Literature 4: Japanese Patent Application Publication No. 2000-180521
Patent Literature 5: Japanese Patent Application Publication No. 2017-133993
Patent Literature 6: Japanese Patent Application Publication No. 2018-007821
Patent Literature 7: Japanese Patent Application Publication No. 2019-124661

SUMMARY OF THE INVENTION

Technical Problem

However, magnetic sensors that each utilize a magnetic impedance element have a limited range in which a magnetic field can be measured. It is therefore necessary, upon measuring a magnetic field, to set an adequate range in which the magnetic field can be measured.

It is hence an object of the present invention to reduce the effort involved in setting a range in which a magnetic field can be measured.

Means for Solving the Problem

According to the present invention, a magnetic field measuring apparatus for measuring a to-be-measured magnetic field, includes: a magnetic impedance element with an impedance change rate that changes depending on the to-be-measured magnetic field; a drive signal providing section arranged to provide a drive signal to the magnetic impedance element; and a measurement range setting section arranged to set a measurement range in which the to-be-measured magnetic field can be measured, wherein a relationship between the to-be-measured magnetic field and the impedance change rate is arranged to change depending on a frequency of the drive signal, and the measurement range setting section is arranged to set the measurement range by setting the frequency.

The thus constructed magnetic field measuring apparatus measures a to-be-measured magnetic field. A magnetic impedance element has an impedance change rate that changes depending on the to-be-measured magnetic field. A drive signal providing section provides a drive signal to the magnetic impedance element. A measurement range setting section sets a measurement range in which the to-be-measured magnetic field can be measured. A relationship between the to-be-measured magnetic field and the impedance change rate is arranged to change depending on a frequency of the drive signal. The measurement range setting section is arranged to set the measurement range by setting the frequency.

According to the magnetic field measuring apparatus of the present invention, the magnetic impedance element may be arranged to have an increased upper limit to which the to-be-measured magnetic field can be measured with an increase in the frequency.

According to the magnetic field measuring apparatus of the present invention, the magnetic impedance element may be arranged to have a reduced maximum value of the impedance change rate with an increase in the frequency.

According to the magnetic field measuring apparatus of the present invention, the magnetic impedance element may be arranged, when the to-be-measured magnetic field is equal to or lower than a measurable upper limit, to have an increased impedance change rate with an increase in the to-be-measured magnetic field.

According to the magnetic field measuring apparatus of the present invention, the magnetic impedance element may be arranged, when the to-be-measured magnetic field is higher than the measurable upper limit, to have a reduced impedance change rate with an increase in the to-be-measured magnetic field.

According to the magnetic field measuring apparatus of the present invention, the magnetic impedance element may be provided with the to-be-measured magnetic field with a negative feedback magnetic field according to an output from the magnetic impedance element subtracted therefrom.

According to the magnetic field measuring apparatus of the present invention, the magnetic impedance element may include a bridge circuit having a first magnetic thin film, a second magnetic thin film, a third magnetic thin film, and a fourth magnetic thin film. The first magnetic thin film is connected in parallel with the second magnetic thin film. The third magnetic thin film is connected in parallel with the fourth magnetic thin film. The first magnetic thin film is connected in series with the third magnetic thin film. The second magnetic thin film is connected in series with the fourth magnetic thin film. A direction of easy magnetization of the first magnetic thin film is the same as a direction of easy magnetization of the fourth magnetic thin film. A direction of easy magnetization of the second magnetic thin film is the same as a direction of easy magnetization of the third magnetic thin film. The direction of easy magnetization of the first magnetic thin film is orthogonal to the direction of easy magnetization of the second magnetic thin film. A bias magnetic field is applied having a direction different from both the direction of easy magnetization of the first magnetic thin film and the direction of easy magnetization of the second magnetic thin film. A voltage is output between a point at which the first magnetic thin film and the third magnetic thin film are connected and a point at which the second magnetic thin film and the fourth magnetic thin film are connected.

According to the magnetic field measuring apparatus of the present invention, the magnetic impedance element may have a pick-up coil.

According to the magnetic field measuring apparatus of the present invention, the magnetic impedance element may have: a first amorphous magnetic layer; a second amorphous magnetic layer; and a conductor disposed between the first amorphous magnetic layer and the second amorphous magnetic layer.

According to the present invention, the magnetic field measuring apparatus may include: a first insulator disposed between the first amorphous magnetic layer and the conductor; and a second insulator disposed between the second amorphous magnetic layer and the conductor.

According to the magnetic field measuring apparatus of the present invention, the magnetic impedance element may have an amorphous thin film, an amorphous wire, or an amorphous ribbon.

According to the magnetic field measuring apparatus of the present invention, the magnetic impedance element may be arranged to measure a magnetic field of at least one axial component.

According to the magnetic field measuring apparatus of the present invention, the measurement range setting section may be arranged to reduce a upper limit to which the to-be-measured magnetic field can be measured.

According to the magnetic field measuring apparatus of the present invention, magnetic noise may be reduced.

According to the magnetic field measuring apparatus of the present invention, the drive signal may be a sinusoidal wave, a square wave, or a pulsed wave signal.

According to the magnetic field measuring apparatus of the present invention, the drive signal may be a chirp signal.

According to the magnetic field measuring apparatus of the present invention, the drive signal may be a band signal having a frequency within a predetermined band.

MODES FOR CARRYING OUT THE INVENTION

A description will now be given of embodiments of the present invention referring to drawings.

First Embodiment

Figure 1:
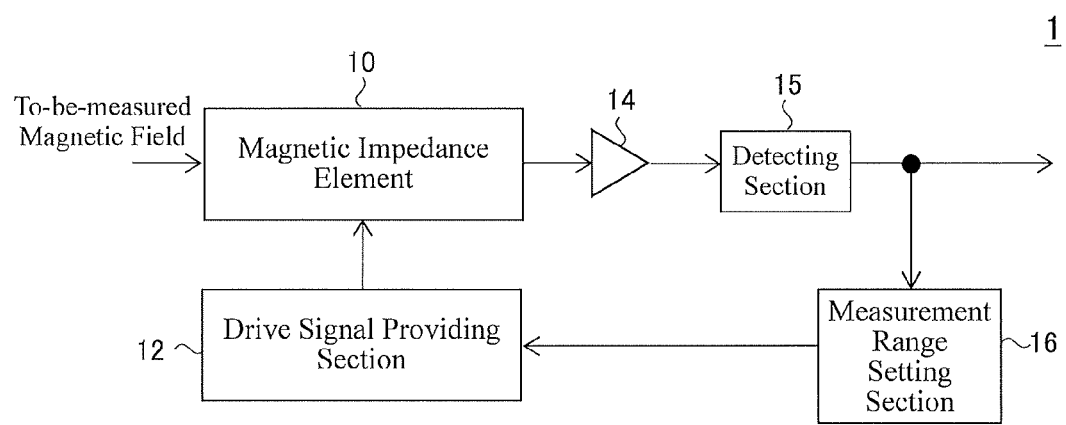
FIG. 1 is a functional block diagram showing the configuration of a magnetic field measuring apparatus according to a first embodiment of the present invention.

FIG. 1 is a functional block diagram showing the configuration of a magnetic field measuring apparatus according to a first embodiment of the present invention. The magnetic field measuring apparatus 1 according to the first embodiment of the present invention includes a magnetic impedance element 10, a drive signal providing section 12, an amplifier 14, a detecting section 15, and a measurement range setting section 16.

The magnetic field measuring apparatus 1 is arranged to measure a to-be-measured magnetic field. The to-be-measured magnetic field may be a weak magnetic field (e.g. cardiac magnetism) or a strong magnetic field (e.g. a kind of magnetic field measured during non-destructive testing of infrastructures).

The magnetic impedance element 10 has an impedance change rate that changes depending on the to-be-measured magnetic field. The magnetic impedance element 10 has a pick-up coil. The magnetic impedance element 10 is arranged to measure a magnetic field of at least one (one, two, three, . . . ) axial component(s).

The amplifier 14 is arranged to amplify an output (e.g. voltage) from the magnetic impedance element 10. The detecting section 15 is arranged to detect an output from the amplifier 14. The drive signal providing section 12 is arranged to provide a drive signal to the magnetic impedance element 10. The measurement range setting section 16 is arranged to set a measurement range in which the to-be-measured magnetic field can be measured.

It is noted that the relationship between the to-be-measured magnetic field and the impedance change rate is arranged to change depending on the frequency of the drive signal. The measurement range setting section 16 is also arranged to set the measurement range by setting the frequency of the drive signal (this may hereinafter be referred to as "drive frequency").

The drive signal is, for example, a sinusoidal wave, a square wave, a pulsed wave, or a chirp signal.

Figure 2:
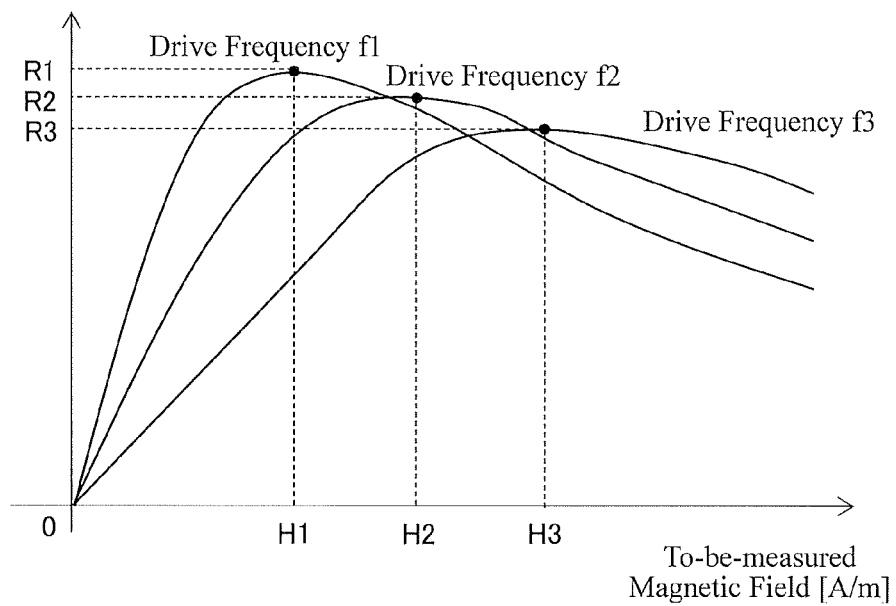
FIG. 2 is a graph showing the characteristics of the magnetic impedance element 10.

FIG. 2 is a graph showing the characteristics of the magnetic impedance element 10. FIG. 2 shows the characteristics in the case of a drive frequency f1, a drive frequency f2, and a drive frequency f3, where f1<f2<f3.

Referring to the characteristic in the case of the drive frequency f1, the impedance change rate has a maximum value of R1 when the to-be-measured magnetic field is H1. When the to-be-measured magnetic field is equal to or lower than H1, the impedance change rate increases with an increase in the to-be-measured magnetic field. When the to-be-measured magnetic field is higher than H1, the impedance change rate decreases with an increase in the to-be-measured magnetic field. Accordingly, when the to-be-measured magnetic field is between 0 and H1, the impedance change rate can be used to uniquely determine the to-be-measured magnetic field. That is, the upper limit to which the to-be-measured magnetic field can be measured is H1.

Similarly, also in the case of the drive frequency f2, the upper limit to which the to-be-measured magnetic field can be measured is H2. Note here that the impedance change rate has a maximum value of R2 when the to-be-measured magnetic field is H2. When the to-be-measured magnetic field is equal to or lower than H2, the impedance change rate increases with an increase in the to-be-measured magnetic field. When the to-be-measured magnetic field is higher than H2, the impedance change rate decreases with an increase in the to-be-measured magnetic field.

Similarly, also in the case of the drive frequency f3, the upper limit to which the to-be-measured magnetic field can be measured is H3. Note here that the impedance change rate has a maximum value of R3 when the to-be-measured magnetic field is H3. When the to-be-measured magnetic field is equal to or lower than H3, the impedance change rate increases with an increase in the to-be-measured magnetic field. When the to-be-measured magnetic field is higher than H3, the impedance change rate decreases with an increase in the to-be-measured magnetic field.

It is noted that H1<H2<H3 and R1>R2>R3.

Here, the magnetic impedance element 10 is arranged to have an increased upper limit of H1, H2, H3 to which the to-be-measured magnetic field can be measured and a reduced maximum value of R1, R2, R3 of the impedance change rate with an increased drive frequency of f1, f2, f3.

Accordingly, the upper limit to which (and therefore the measurement range in which) the to-be-measured magnetic field can be measured can be set by setting the drive frequency.

For example, in order to avoid saturation when a weak magnetic field is measured, a reduced drive frequency of f3, f2, f1 may provide a reduced upper limit of H3, H2, H1 to which the to-be-measured magnetic field can be measured. This results in an increased maximum value of R3, R2, R1 of the impedance change rate and therefore an increased sensitivity of R3/H3, R2/H2, R1/H1.

Next will be described an operation according to the first embodiment.

A to-be-measured magnetic field (e.g. cardiac magnetism) is first provided to the magnetic field measuring apparatus 1. The impedance change rate of the magnetic impedance element 10 changes depending on the to-be-measured magnetic field and an output (e.g. voltage) according to the impedance change rate is output from the magnetic impedance element 10. The output from the magnetic impedance element 10 is amplified through the amplifier 14 and detected through the detecting section 15. Note here that the amplifier 14 may be provided after the detecting section 15 or may be provided before and after the detecting section 15.

It is noted that the magnetic impedance element 10 is provided with a drive signal from the drive signal providing section 12. Then, since the output from the magnetic impedance element 10 can be said to be modulated with the drive signal, detection (demodulation) through the detecting section 15 allows measurement data of the to-be-measured magnetic field to be obtained.

The output from the detecting section 15 is provided to the measurement range setting section 16. Based on the output from the detecting section 15, the measurement range setting section 16 sets a measurement range in which the to-be-measured magnetic field can be measured. For example, if the output from the detecting section 15 is much smaller than the upper limit to which the to-be-measured magnetic field can be measured, a gradually reduced drive frequency (of, for example, f3, f2, f1 (see FIG. 2)) and therefore a gradually reduced upper limit to which the to-be-measured magnetic field can be measured (of, for example, H3, H2, H1 (see FIG. 2)) is provided. It is noted that while the measurement range setting section 16 may operate automatically based on the output from the detecting section 15 as described above, a user may manually operate the measurement range setting section 16.

In accordance with the first embodiment, it is possible to set, with reduced effort, the measurement range in which the magnetic field can be measured by changing the drive frequency.

It is noted that a magnetic noise reducing element may be added to the magnetic field measuring apparatus 1 according to the first embodiment. Such a magnetic noise reducing element has been well known and not described herein (see Patent Literature 5 (Japanese Patent Application Publication No. 2017-133993), Patent Literature 6 (Japanese Patent Application Publication No. 2018-007821), and Patent Literature 7 (Japanese Patent Application Publication No. 2019-124661)).

Second Embodiment

The second embodiment differs from the first embodiment in that a loop filter 18 and a negative feedback coil 19 are provided.

Figure 3:
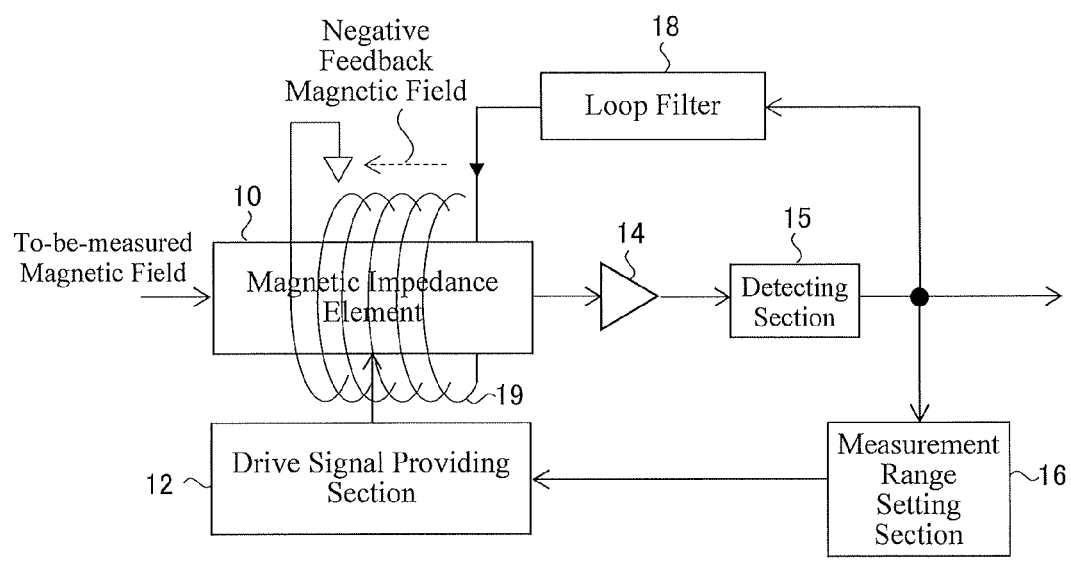
FIG. 3 is a functional block diagram showing the configuration of a magnetic field measuring apparatus 1 according to the second embodiment of the present invention.

FIG. 3 is a functional block diagram showing the configuration of a magnetic field measuring apparatus 1 according to the second embodiment of the present invention. The magnetic field measuring apparatus 1 according to the first embodiment of the present invention includes a magnetic impedance element 10, a drive signal providing section 12, an amplifier 14, a detecting section 15, a measurement range setting section 16, a loop filter 18, and a negative feedback coil 19. Components identical to those in the first embodiment will be designated by the same references to omit the description thereof.

The magnetic impedance element 10, the drive signal providing section 12, the amplifier 14, the detecting section 15, and the measurement range setting section 16 are the same as those in the first embodiment and will not be described.

The loop filter 18 is arranged to receive and provide an output from the detecting section 15 to the negative feedback coil 19. The negative feedback coil 19 is arranged to receive an output from the magnetic impedance element 10 through the loop filter 18.

The negative feedback coil 19 is further arranged to generate a negative feedback magnetic field according to the output from the magnetic impedance element 10. The magnetic impedance element 10 is provided with the to-be-measured magnetic field with the negative feedback magnetic field subtracted therefrom.

Next will be described an operation according to the second embodiment. Note here that operations identical to those in the first embodiment will not be described.

The output from the detecting section 15 is provided not only to the measurement range setting section 16, but also to the negative feedback coil 19 through the loop filter 18. The negative feedback coil 19 generates a negative feedback magnetic field according to the output from the magnetic impedance element 10. The magnetic impedance element 10 is provided with the to-be-measured magnetic field with the negative feedback magnetic field subtracted therefrom.

The second embodiment exhibits the same advantageous effects as the first embodiment.

Additionally, in accordance with the second embodiment, the ratio between the to-be-measured magnetic field and the output from the detecting section 15 can be kept nearly constant by increasing the gain of the amplifier 14.

Third Embodiment

The third embodiment, in which the magnetic impedance element 10 includes a bridge circuit, differs from the first embodiment, in which the magnetic impedance element 10 has a pick-up coil.

Figure 4:
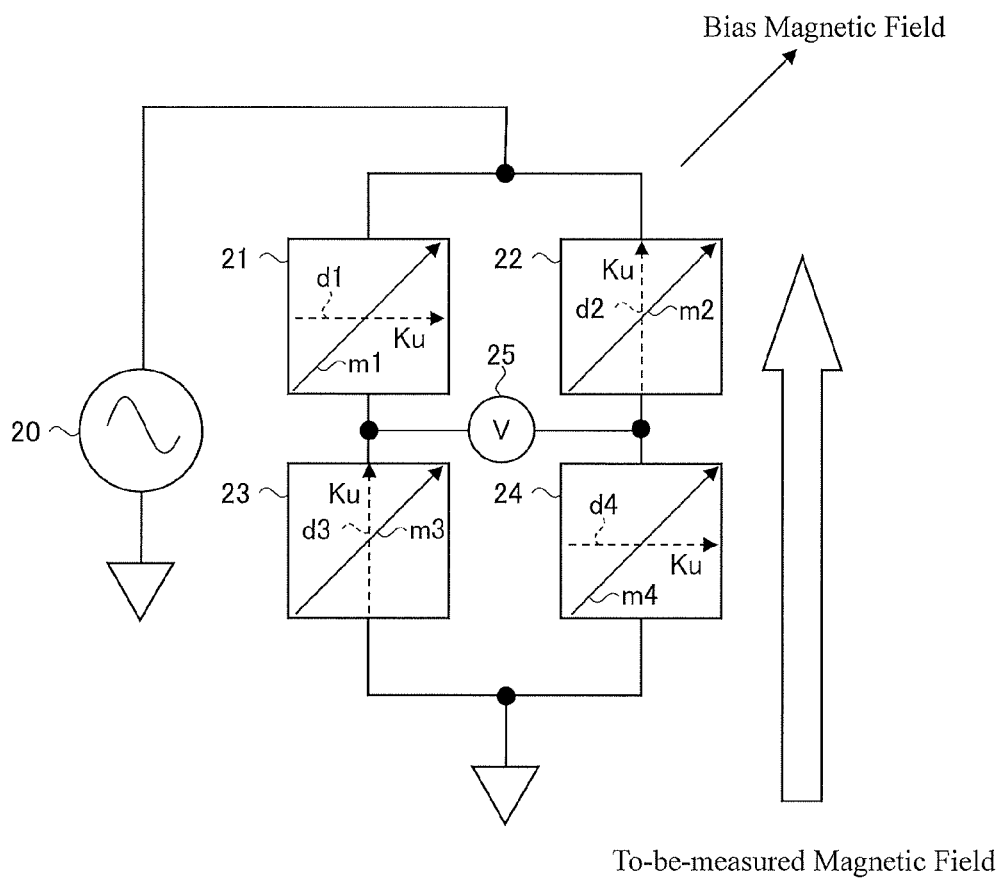
FIG. 4 shows the configuration of the magnetic impedance element 10 in the magnetic field measuring apparatus 1 according to the third embodiment of the present invention.

FIG. 4 shows the configuration of the magnetic impedance element 10 in the magnetic field measuring apparatus 1 according to the third embodiment of the present invention. The drive signal providing section 12, the amplifier 14, the detecting section 15, and the measurement range setting section 16 are the same as those in the first embodiment and will not be described (see FIG. 1).

The magnetic impedance element 10 in the magnetic field measuring apparatus 1 according to the third embodiment includes a high-frequency power source 20 and a bridge circuit having a first magnetic thin film 21, a second magnetic thin film 22, a third magnetic thin film 23, a fourth magnetic thin film 24, and a voltage output unit 25.

The high-frequency power source 20 is arranged to provide a high-frequency voltage to the bridge circuit. The first magnetic thin film 21 is connected in parallel with the second magnetic thin film 22. The third magnetic thin film 23 is connected in parallel with the fourth magnetic thin film 24. The first magnetic thin film 21 is connected in series with the third magnetic thin film 23. The second magnetic thin film 22 is connected in series with the fourth magnetic thin film 24.

The direction of easy magnetization d1 of the first magnetic thin film 21 is the same as the direction of easy magnetization d4 of the fourth magnetic thin film 24. Note here that the first magnetic thin film 21 and the fourth magnetic thin film 24 each have an anisotropic constant of Ku.

The direction of easy magnetization d2 of the second magnetic thin film 22 is the same as the direction of easy magnetization d3 of the third magnetic thin film 23. Note here that the second magnetic thin film 22 and the third magnetic thin film 23 each also have an anisotropic constant of Ku.

The direction of easy magnetization d1 of the first magnetic thin film 21 is orthogonal to the direction of easy magnetization d2 of the second magnetic thin film 22. A bias magnetic field is applied having a direction different from both the direction of easy magnetization d1 of the first magnetic thin film 21 and the direction of easy magnetization d2 of the second magnetic thin film 22. For example, the direction of the bias magnetic field forms an angle of 45 degrees with both the direction of easy magnetization d1 and the direction of easy magnetization d2.

It is noted that the magnetization vector m1 of the first magnetic thin film 21, the magnetization vector m2 of the second magnetic thin film 22, the magnetization vector m3 of the third magnetic thin film 23, and the magnetization vector m4 of the fourth magnetic thin film 24 each have the same direction as the bias magnetic field.

A voltage is output between a point at which the first magnetic thin film 21 and the third magnetic thin film 23 are connected and a point at which the second magnetic thin film 22 and the fourth magnetic thin film 24 are connected. The voltage output unit 25 is arranged to output the voltage.

Next will be described an operation according to the third embodiment. Note here that the operations of the drive signal providing section 12, the amplifier 14, the detecting section 15, the measurement range setting section 16, and the loop filter 18 are the same as those in the first embodiment and will not be described.

A to-be-measured magnetic field is first applied to the magnetic impedance element 10. The direction of the to-be-measured magnetic field is the same as the direction of easy magnetization d2 of the second magnetic thin film 22.

Then, since the magnetization vector m1 of the first magnetic thin film 21 rotates away from the direction of easy magnetization d1, the first magnetic thin film 21 has an increased impedance. Similarly, since the magnetization vector m4 of the fourth magnetic thin film 24 rotates away from the direction of easy magnetization d4, the fourth magnetic thin film 24 also has an increased impedance.

On the other hand, since the magnetization vector m2 of the second magnetic thin film 22 rotates closer to the direction of easy magnetization d2, the second magnetic thin film 22 has a reduced impedance. Similarly, since the magnetization vector m3 of the third magnetic thin film 23 rotates closer to the direction of easy magnetization d3, the third magnetic thin film 23 also has a reduced impedance.

The point at which the first magnetic thin film 21 and the third magnetic thin film 23 are connected then has a reduced electric potential. On the other hand, the point at which the second magnetic thin film 22 and the fourth magnetic thin film 24 are connected has an increased electric potential. Accordingly, the voltage changes depending on the to-be-measured magnetic field between the point at which the first magnetic thin film 21 and the third magnetic thin film 23 are connected and the point at which the second magnetic thin film 22 and the fourth magnetic thin film 24 are connected. The voltage is output from the voltage output unit 25.

The third embodiment exhibits the same advantageous effects as the first embodiment.

Fourth Embodiment

The fourth embodiment, in which the magnetic impedance element 10 includes an amorphous magnetic layer, differs from the first embodiment, in which the magnetic impedance element 10 has a pick-up coil.

Figure 5:
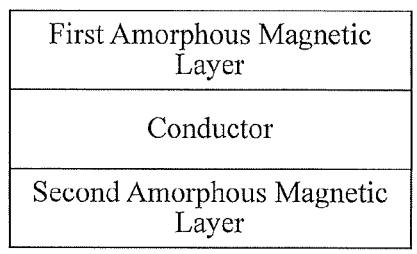
FIGS. 5 (a) and 5 (b) show the configuration of the magnetic impedance element 10 in the magnetic field measuring apparatus 1 according to the fourth embodiment of the present invention (FIG. 5 (a)) and a variation thereof (FIG. 5 (b))
Figure 5:
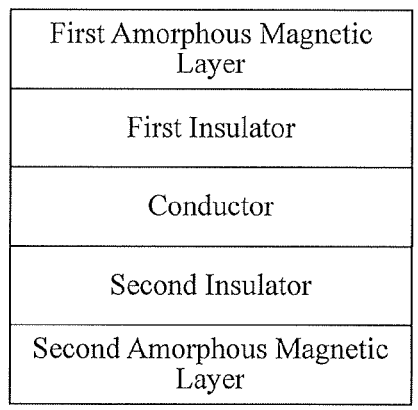

FIG. 5 shows the configuration of the magnetic impedance element 10 in the magnetic field measuring apparatus 1 according to the fourth embodiment of the present invention (FIG. 5 (a)) and a variation thereof (FIG. 5 (b)). The drive signal providing section 12, the amplifier 14, the detecting section 15, and the measurement range setting section 16 are the same as those in the first embodiment and will not be described (see FIG. 1).

Referring to FIG. 5 (a), the magnetic impedance element 10 has a first amorphous magnetic layer, a second amorphous magnetic layer, and a conductor. Note here that the conductor (e.g. copper) is disposed between the first amorphous magnetic layer and the second amorphous magnetic layer.

The fourth embodiment exhibits the same advantageous effects as the first embodiment.

It is noted that the conductor may not necessarily be in contact with the first amorphous magnetic layer and the second amorphous magnetic layer, though otherwise in the fourth embodiment.

That is, referring to FIG. 5 (b), the magnetic impedance element 10 has a first amorphous magnetic layer, a second amorphous magnetic layer, a conductor, a first insulator, and a second insulator. The first insulator is disposed between the first amorphous magnetic layer and the conductor. The second insulator is disposed between the second amorphous magnetic layer and the conductor.

Figure 6:
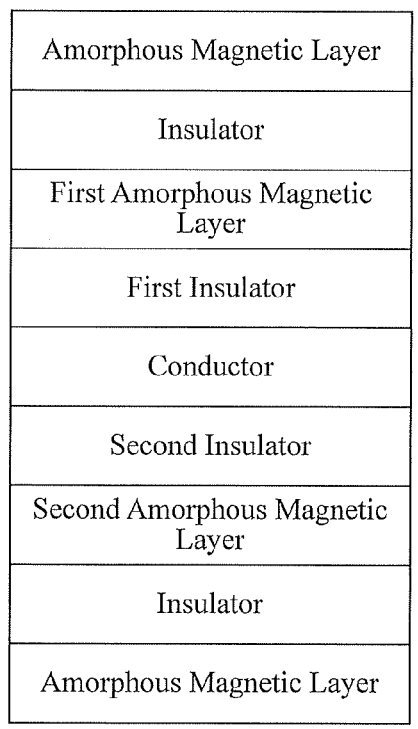
FIG. 6 shows the configuration of the magnetic impedance element 10 according to another variation of the fourth embodiment of the present invention.

A further amorphous magnetic layer and a further insulating layer may be added in the variation shown in FIG. 5 (b). FIG. 6 shows the configuration of the magnetic impedance element 10 according to another variation of the fourth embodiment of the present invention.

Referring to FIG. 6, further insulating layers and further amorphous magnetic layers are disposed over the first amorphous magnetic layer and below the second amorphous magnetic layer in the variation shown in FIG. 5 (b). Note here that the insulating layer over the first amorphous magnetic layer is disposed between the first amorphous magnetic layer and one of the further amorphous magnetic layers. The insulating layer below the second amorphous magnetic layer is disposed between the second amorphous magnetic layer and the other amorphous magnetic layer.

It is noted that the magnetic impedance element 10 may have an amorphous wire or an amorphous ribbon, though including the first and second amorphous magnetic layers in the fourth embodiment and the variations thereof. The magnetic impedance element may have an amorphous thin film.

Fifth Embodiment

The fifth embodiment differs from the first embodiment in that the drive signal is a band signal.

Figure 7:
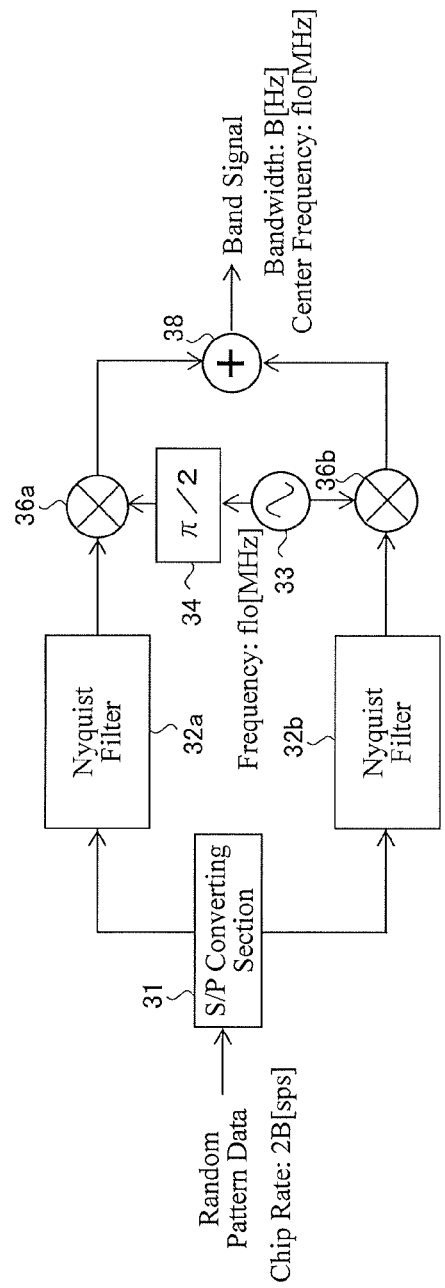
FIG. 7 is a functional block diagram showing the configuration of the drive signal providing section 12 in the magnetic field measuring apparatus 1 according to the fifth embodiment of the present invention.

FIG. 7 is a functional block diagram showing the configuration of the drive signal providing section 12 in the magnetic field measuring apparatus 1 according to the fifth embodiment of the present invention. It is noted that the magnetic impedance element 10, the amplifier 14, the detecting section 15, and the measurement range setting section 16 are the same as those in the first embodiment and will not be described (see FIG. 1).

The drive signal providing section 12 according to the fifth embodiment is arranged to output, as a drive signal, a band signal having a frequency within a predetermined band (with a center frequency of flo [MHz] and a bandwidth of B [Hz]), having an S/P converting section 31, Nyquist filters 32a, 32b, a carrier signal source 33, a 90-degree phase shifter 34, mixers 36a, 36b, and an adder 38.

The S/P converting section 31 is arranged to receive random pattern data (preferably showing strong autocorrelation, such as PN code or M-sequence) with a chip rate of 2B [sps], convert it into a parallel signal, and provide it to the Nyquist filters 32a and 32b. The Nyquist filters 32a, 32b are arranged to filter the output from the S/P converting section 31 and provide, respectively, to the mixers 36a, 36b. The carrier signal source 33 is arranged to output a carrier signal (with a frequency of flo [MHz]). The 90-degree phase shifter 34 is arranged to receive the carrier signal and shift its phase by 90 degrees for output. The mixer 36a is arranged to multiply the output from the Nyquist filter 32a and the output from the 90-degree phase shifter 34 for output. The mixer 36b is arranged to multiply the output from the Nyquist filter 32b and the carrier signal for output. The adder 38 is arranged to add the output from the mixer 36a and the output from the mixer 36b for output. The adder 38 then outputs a band signal (with a bandwidth of B [Hz] and a center frequency of flo [MHz]).

Next will be described an operation according to the fifth embodiment. Note here that the operations of the magnetic impedance element 10, the amplifier 14, the detecting section 15, the measurement range setting section 16, and the loop filter 18 are the same as those in the first embodiment and will not be described.

Random pattern data with a chip rate of 2B [sps] is converted through the S/P converting section 31 into a parallel signal and provided to each of the mixers 36a, 36b through each of the Nyquist filters 32a, 32b. The output from the Nyquist filter 32a is multiplied through the mixer 36a by the carrier signal with the phase thereof shifted by 90 degrees. The output from the Nyquist filter 32b is multiplied through the mixer 36b by the carrier signal. The output from the mixer 36a and the output from the mixer 36b are added through the adder 38 to be a band signal (with a bandwidth of B [Hz] and a center frequency of flo [MHz]).

The fifth embodiment exhibits the same advantageous effects as the first embodiment.

DESCRIPTION OF REFERENCE NUMERAL

1 Magnetic Field Measuring Apparatus
10 Magnetic Impedance Element
12 Drive Signal Providing Section
14 Amplifier
15 Detecting Section
16 Measurement Range Setting Section
18 Loop Filter
19 Negative Feedback Coil
20 High-Frequency Power Source
21 First Magnetic Thin Film
22 Second Magnetic Thin Film
23 Third Magnetic Thin Film
24 Fourth Magnetic Thin Film
25 Voltage Output Unit

The invention claimed is:

1. A magnetic field measuring apparatus for measuring a to-be-measured magnetic field, comprising:
  a magnetic impedance element with an impedance change rate that changes depending on the to-be-measured magnetic field;
  a drive signal providing section arranged to provide a drive signal to the magnetic impedance element; and
  a measurement range setting section arranged to set a measurement range in which the to-be-measured magnetic field can be measured, wherein
  a relationship between the to-be-measured magnetic field and the impedance change rate is arranged to change depending on a frequency of the drive signal,
  the measurement range setting section is arranged to set the measurement range by setting the frequency, and
  the measurement range setting section is arranged to reduce an upper limit to which the to-be-measured magnetic field can be measured.

2. The magnetic field measuring apparatus according to claim 1, wherein
  the magnetic impedance element is arranged to have an increased upper limit to which the to-be-measured magnetic field can be measured with an increase in the frequency.

3. The magnetic field measuring apparatus according to claim 1, wherein
  the magnetic impedance element is arranged to have a reduced maximum value of the impedance change rate with an increase in the frequency.

4. The magnetic field measuring apparatus according to claim 1, wherein
  the magnetic impedance element is arranged, when the to-be-measured magnetic field is equal to or lower than a measurable upper limit, to have an increased impedance change rate with an increase in the to-be-measured magnetic field.

5. The magnetic field measuring apparatus according to claim 4, wherein
  the magnetic impedance element is arranged, when the to-be-measured magnetic field is higher than the measurable upper limit, to have a reduced impedance change rate with an increase in the to-be-measured magnetic field.

6. The magnetic field measuring apparatus according to claim 1, wherein
the magnetic impedance element is provided with the to-be-measured magnetic field with a negative feedback magnetic field according to an output from the magnetic impedance element subtracted therefrom.

7. The magnetic field measuring apparatus according to claim 1, wherein
the magnetic impedance element comprises a bridge circuit having a first magnetic thin film, a second magnetic thin film, a third magnetic thin film, and a fourth magnetic thin film,
the first magnetic thin film is connected in parallel with the second magnetic thin film,
the third magnetic thin film is connected in parallel with the fourth magnetic thin film,
the first magnetic thin film is connected in series with the third magnetic thin film,
the second magnetic thin film is connected in series with the fourth magnetic thin film,
a direction of easy magnetization of the first magnetic thin film is the same as a direction of easy magnetization of the fourth magnetic thin film,
a direction of easy magnetization of the second magnetic thin film is the same as a direction of easy magnetization of the third magnetic thin film,
the direction of easy magnetization of the first magnetic thin film is orthogonal to the direction of easy magnetization of the second magnetic thin film,
a bias magnetic field is applied having a direction different from both the direction of easy magnetization of the first magnetic thin film and the direction of easy magnetization of the second magnetic thin film, and
a voltage is output between a point at which the first magnetic thin film and the third magnetic thin film are connected and a point at which the second magnetic thin film and the fourth magnetic thin film are connected.

8. The magnetic field measuring apparatus according to claim 1, wherein
the magnetic impedance element has a pick-up coil.

9. The magnetic field measuring apparatus according to claim 1, wherein
the magnetic impedance element has:
a first amorphous magnetic layer;
a second amorphous magnetic layer; and
a conductor disposed between the first amorphous magnetic layer and the second amorphous magnetic layer.

10. The magnetic field measuring apparatus according to claim 9, comprising:
a first insulator disposed between the first amorphous magnetic layer and the conductor; and
a second insulator disposed between the second amorphous magnetic layer and the conductor.

11. The magnetic field measuring apparatus according to claim 1, wherein
the magnetic impedance element has an amorphous thin film, an amorphous wire, or an amorphous ribbon.

12. The magnetic field measuring apparatus according to claim 1, wherein
the magnetic impedance element is arranged to measure a magnetic field of at least one axial component.

13. The magnetic field measuring apparatus according to claim 1, wherein
magnetic noise is reduced.

14. The magnetic field measuring apparatus according to claim 1, wherein
the drive signal is a sinusoidal wave, a square wave, or a pulsed wave signal.

15. The magnetic field measuring apparatus according to claim 1, wherein
the drive signal is a chirp signal.

16. The magnetic field measuring apparatus according to claim 1, wherein
the drive signal is a band signal having a frequency within a predetermined band.

* * * * *